Dec. 26, 1961     L. E. MATTHEWS ETAL     3,014,341
SELF-SUSTAINING MOMENTUM MOTOR
Filed March 28, 1961

INVENTORS
LYLE E. MATTHEWS
EDWIN M. GOOD
BY
ATTORNEYS 3,014,341
SELF-SUSTAINING MOMENTUM MOTOR
Lyle E. Matthews, 3412 Minna St., Oxnard, Calif., and Edwin M. Good, 480 Mint Lane, Ventura, Calif.
Filed Mar. 28, 1961, Ser. No. 98,993
9 Claims. (Cl. 60—1)
(Granted under Title 35, U.S. Code (1952), sec. 266)

The invention described herein may be manufactured and used by or for the Government of the United States of America for governmental purposes without the payment of any royalties thereon or therefor.

The present invention relates to a self-sustaining momentum motor and more particularly to a device which maintains a substantially constant speed over a period of time by utilizing its own momentum.

There is a need for a light and simple device which will supply a substantially constant frequency power source for a period of time. Heretofore, batteries, electric motors, gas engines, etc. have been employed for providing this required power. However, these devices present a weight problem and are often overly complex for their intended function. It is a common requirement in missile work for an electric generator to operate at a substantially constant speed over a short period of time such as for a period of time after the launch of a missile. Further, there is a requirement for such a device for driving a gyro at a constant speed. The present invention has provided a simple and light-weight device which will meet these requirements. This is accomplished by rotating a container having a liquid and a gas under a pressure at an angular velocity which is at or higher than the desired sustaining velocity of the container. The container has at least one channel for directing the liquid inwardly toward the container's axis of rotation. After the container is brought up to speed and then allowed to rotate free from any external power source the gas pressure within the container, upon the container reaching the sustaining angular velocity, will overcome the centrifugal force on the liquid, thus causing the liquid to be discharged through the channel. This results in a release of kinetic energy to the container as a whole, this release maintaining a substantially constant angular velocity of the container until the liquid is completely discharged.

Accordingly, an object of the present invention is to provide a light and simple device which will maintain a substantially constant frequency power source over a period of time.

Another object is to provide a device which utilizes the conservation of momentum principles for maintaining a constant angular velocity over a period of time.

A further object of the invention is the provision of a device which will maintain a predetermined angular velocity after the device is brought to or above this velocity by some external power source.

Still another object is to provide a self-sustaining motor which is simple of construction and reliable in operation.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
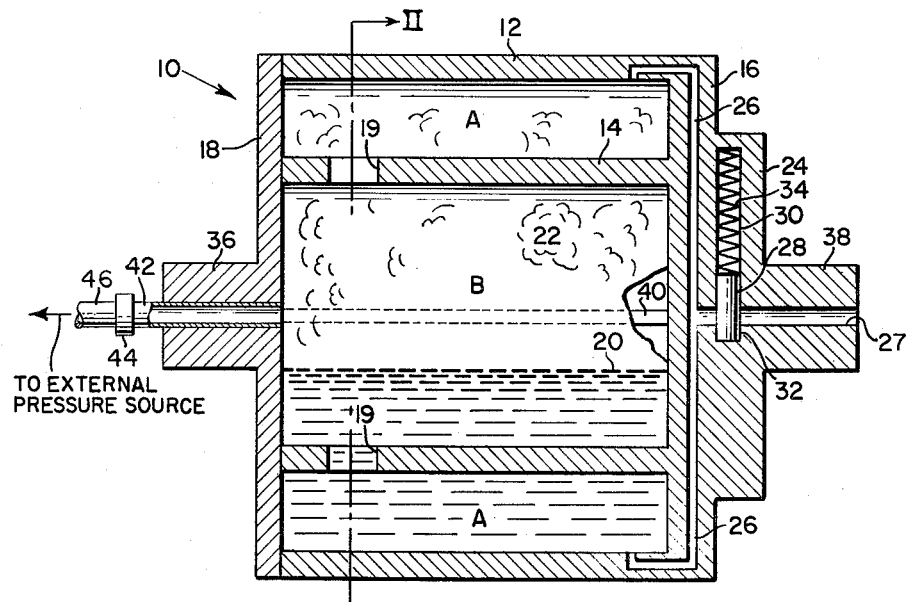
FIG. 1 shows a cross-sectional side view of the device in a static condition.
Figure 2:
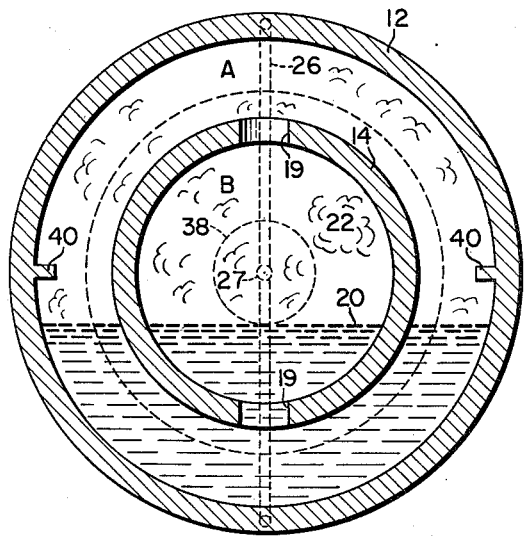
FIG. 2 shows a cross-sectional view taken along line II—II of FIG. 1.

Referring now to the drawing wherein like reference numerals designate like or corresponding parts throughout the several views there is shown in the figures a container 10 having an outer shell 12 and in the preferred embodiment an inner shell 14. These shells in conjunction with a forward end plate 16 and an after end plate 18 divide the container into an outer portion A and an inner portion B. In the preferred embodiment the portion A is annular and portion B is cylindrical, these portions communicating with one another through openings 19. Within the container is a liquid 20 and a gas 22, the liquid being located in the bottom of the container and the gas being located in the top of the container when the container is in a static condition. Within the outer shell 12 itself, the forward plate 16 and a flange 24 are radial channels 26 which communicate an outer periphery of the annular portion A with a fluid of a lower pressure, such as the atmosphere. The channels 26 join with an axial channel 27, the axial channel being opened and closed by a valve such as a cylindrical pin 28. The pin is slidably mounted within an upper recess 30 and a lower recess 32 of the flange 24 and is positioned therein with the centroid of its mass spaced from the longitudinal axis when the pin is closing the channel. The upper recess 30 has a compression spring 34 which biases the pin to a closed position. The mass of the pin, the location of its centroid, the sliding friction thereon and the strength of the spring are to be considered in designing the pin so that it will open the channel 27 when the container is rotated at a predetermined angular velocity and close the channel at velocities therebelow.

The container is provided with shafts 36 and 38 as a means for rotatably mounting the container in a bearing support (not shown). The container is brought up to a desired angular velocity (which is at or above the predetermined angular velocity) by a direct drive to a motor generator or an external power source (not shown), this power source being connected as an integral part of the container or by any suitable means such as a releasable coupling connected to the shaft 36 or a disengagable driving gear driving a ring gear attached to the shaft 36. Radially mounted within the outer annular portion A are a plurality of baffles 40, these baffles being used to bring the liquid up to the desired angular velocity within a short period of time. Inserted through the axis of the shaft 36 is a tube 42 which opens into portion B. A rotating coupling 44 joins the tube 42 with another tube 46, the tube 46 being connected to an external pressure source (not shown). The source could of course be internal such as by an explosive or other gas generating solid.

The differential between the pressure within the container and the lower fluid pressure is to be substantially equal to the centrifugal pressure on the liquid column in channel 26, $$\rho \int_0^R \omega^2 r \, dr$$

where $\rho$ is the mass per unit volume of the liquid, $r$ is the radius from the axis of rotation of the container to the centroid of an incremental mass of the liquid, $R$ is the radius from the axis of rotation to the liquid-gas interface and $\omega$ is the predetermined sustaining angular velocity of the container. Accordingly, at all velocities below this predetermined angular velocity the differential in pressure will overcome the centrifugal pressure of the liquid thus forcing the liquid through the channel 26 toward the axis of rotation of the container. Also, at all velocities substantially greater than the predetermined angular velocity, the centrifugal pressure on the liquid column in channel 26 exceeds the gas pressure and the liquid is not expended.

The container maintains itself substantially at the predetermined velocity by utilizing the conservation of energy principle. This principle is illustrated by letting the initial energy in the wheel be equal to $$\frac{\omega^2}{2}(I_c + I_L)$$

and the energy in the gas be equal to $PV_1$ where $I_c$ is the mass moment of inertia of the container, $I_L$ the mass moment of inertia of the liquid annulus, P is pressure and $V_1$ is the initial volume in the container, not filled by fluid. The work W done upon the liquid being expended can then be equated to the change of energy in the wheel:

$$W = \frac{I_c}{2}(\omega_1^2 - \omega_2^2) + \frac{\omega_1^2}{2} I_L$$

where the subscripts 1 and 2 represent the initial conditions and the final conditions respectively.

But from conservation of energy the term $$\frac{\omega_1^2}{2} I_L = P_1 V_1 - P_2 V_2$$

Assuming adiabatic expansion; $PV^\gamma$ = constant $$\frac{\omega_1^2}{2} I_L = P_1 V_1 \left[ 1 - \left(\frac{V_1}{V_2}\right)^{\gamma-1} \right]$$

where $\gamma$ = the ratio of specific heats $$\frac{C_P}{C_V}$$

for the gas (1.4 for air).

With a constant angular velocity the term $$\frac{I_c}{2}(\omega_1^2 - \omega_2^2)$$

is zero, and $$W = P_1 V_1 \left[ 1 - \left(\frac{V_1}{V_2}\right)^{\gamma-1} \right]$$

In the operation of the device the cylindrical container is rotated by the external power supply to an angular velocity at or above the predetermined velocity, preferably the latter. When the container is so rotated the liquid is forced to occupy portion A of the container and the gas occupies portion B of the container. The liquid will be discharged from the container only at the predetermined angular velocity or some velocity substantially close thereto. When the container is rotated above the predetermined angular velocity the centrifugal pressure on the liquid will be greater than the differential between the container pressure and the lower fluid pressure, thus preventing the liquid from traveling through the channels 26, and at velocities below the predetermined velocity the pin 32 will close the channel 27 preventing any discharge from the container. At angular velocities of the container at or above the predetermined angular velocity the pin 32 will slide within the recesses 30 and 32 by centrifugal force so as to open the channel 27. Assuming that the container is brought to an angular velocity above the predetermined velocity the centrifugal force on the liquid will retain the liquid within the portion A even though the differential in pressure is acting on this liquid. However, when the container slows down to the predetermined angular velocity, the differential in pressure between the container and the lower fluid will overcome the centrifugal force to discharge the liquid through the channel 27. When the liquid is discharged through the channel it will give up kinetic energy to the overall container in the same manner as kinetic energy is given up to a rotating skater when he pulls his arms from an outward position to an inward position. The liquid is discharged through the shaft 38 into the lower fluid pressure where it may be retained for further use. The container will be sustained at the predetermined angular velocity so long as some of the liquid is within the container. As soon as the liquid is completely discharged from the container, the container will then proceed to slow to a static condition by friction on the shafts 36 and 38. On an optional basis the external pressure source (not shown) may be used for maintaining a predetermined pressure within the container upon the discharge of the liquid. Preferably the pressure is maintained at a constant until the liquid is completely discharged, thus more nearly keeping the device at a constant speed during the discharge. The baffles are used as an aid to bring the fluid up to the desired velocity since the fluid has a tendency to remain static even though the container is rotated.

It is now readily apparent that the present invention provides a simple and reliable device which will sustain itself at a predetermined angular velocity for a period of time. The device eliminates the need for complicated power sources having undue weight where the requirement is merely to furnish a constant motive force over the specified period of time.

Obviously many modifications and variations of the present invention are possible in the light of the above teachings. It is, therefore, to be understood that within the scope of the appended claims the invention may be practiced otherwise than as specifically described.

We claim:

1. A momentum device comprising a container having an axis of rotation, a liquid and a gas within the container acting on one another under a pressure, the liquid being forced to an outer portion within the container when the container is rotated at a sufficient angular velocity to overcome the force of gravity on said liquid, means for exhausting the liquid from the outer portion toward the axis of rotation and for discharging it intermediate the outer portion and the axis of rotation to a lower pressure environment than the pressure within the container whereby at a predetermined angular velocity the differential between the liquid/gas pressure and the lower pressure causes the liquid to travel toward the axis of rotation thereby giving up kinetic energy to maintain said predetermined angular velocity.

2. A momentum motor comprising a container having an axis of rotation, a liquid and a gas within the container under a pressure, the liquid being forced to an outer portion within the container when the container is rotated at a sufficient angular velocity to overcome the force of gravity on said liquid, means fixed to the container and communicating the outer portion with a fluid under a lower pressure than the liquid/gas pressure for directing the liquid at the outer portion toward said axis, means for closing the directing means to the lower fluid pressure below a predetermined angular velocity and for opening the directing means to the lower fluid pressure at the predetermined angular velocity, the differential in pressure between the liquid/gas pressure and the lower fluid pressure being substantially equal to $$\rho \int_0^R \omega^2 r \, dr$$

where $\rho$ is the mass/unit volume of the liquid, $r$ is the radius from the axis of rotation to the centroid of an incremental mass of the liquid, R is the radius from the axis to the liquid/gas interface and $\omega$ is the predetermined angular velocity whereby upon bringing the container and the liquid substantially to the predetermined angular velocity the closing and opening means will open the directing means and the liquid/gas pressure will force the liquid through the directing means causing the container to substantially maintain its predetermined angular velocity without the application of any external power source until all the liquid is expended.

3. A momentum motor as claimed in claim 2 wherein the container is cylindrical in shape and the axis of rotation coincides with the container's central axis.

4. A momentum motor as claimed in claim 3 wherein the container has an inner cylindrical shell spaced from an outer cylindrical shell, said inner cylindrical shell enclosing a space having at least one opening communicating this space with the space between the two said shells, whereby the liquid upon rotation of the container at the sufficient angular velocity will occupy at least a portion of the space between the two shells and the gas will occupy at least a portion of the space within the inner cylindrical shell.

5. A momentum motor as claimed in claim 4 wherein baffles are mounted within the space between the two cylindrical shells to aid in bringing the liquid up to operating angular velocity.

6. A momentum motor as claimed in claim 5 wherein the container has two end walls, said directing means including a channel, the channel having an intake which opens into the space between the cylindrical shells and having an outlet which opens into said exterior pressure, said channel traveling within the outer cylindrical shell and within one of the end walls.

7. A momentum motor as claimed in claim 6 wherein the means for opening and closing the directing means includes a flanged portion integral with the end wall having the channel, said channel traveling through the flanged portion, a valve slidably mounted within the flange and having one position for opening the channel and another position for closing the channel, means for biasing the valve to a closed position, the centroid of the mass of the valve being remote from the axis of rotation of the container when it is in a closed position so that upon rotation of the container centrifugal force is exerted on the valve, and the mass of the valve in conjunction with the resistance of the spring and the sliding friction between the valve and the flange being of such a magnitude that the valve slides to an open position when the container is rotated at the predetermined angular velocity whereby at angular velocities above the predetermined value the valve is open and at angular velocities below the predetermined value the valve is closed.

8. A momentum motor which maintains a substantially constant predetermined angular velocity in a power-off condition comprising a cylindrical container rotatable about its central axis, said container having an outer shell and an inner shell spaced from one another so as to divide the container into an inner portion and an outer portion, said inner shell having at least one opening communicating the two said portions with one another, a liquid and a gas within the container under a pressure so that upon rotation of the container at a sufficient angular velocity the liquid will be forced to occupy at least a portion of the outer portion and the gas will occupy the remainder of the container said container having a channel communicating the outer portion with a fluid of a lower pressure than the liquid/gas pressure, at least a portion of the channel traveling toward said axis of rotation, the differential in pressure between the liquid/gas pressure and the lower fluid pressure being substantially equal to $$\rho \int_0^R r\, dr\, \omega^2$$

where $\rho$ is the mass/unit volume of the liquid, $r$ is the radius from the axis of rotation to the centroid of an incremental mass of the liquid, $R$ is the radius from the axis of rotation to the liquid-gas interface, and $\omega$ is the predetermined angular velocity, and means responsive to the angular velocity of the container for opening the channel substantially at the predetermined angular velocity and closing the channel at velocities therebelow whereby upon bringing the container and the liquid substantially to the predetermined angular velocity the channel will open and the liquid/gas pressure will force the liquid through the channel causing the liquid to give up kinetic energy to the container thus substantially maintaining the container at the predetermined velocity without the application of any external power source.

9. A momentum device comprising a container having an axis of rotation, at least two fluids within the container with one fluid being more dense in specific gravity than the other fluid, said fluids acting on one another under a pressure which is greater than a pressure in an environment outside of said container, the more dense fluid being forced to an outer portion within the container when the container is rotated about said axis at a sufficient angular velocity to overcome the force of gravity on said latter fluid, means for exhausting the more dense fluid from the outer portion toward the axis of rotation to said environment whereby at a predetermined angular velocity the differential in pressure between inside the container and said environment causes the fluid to travel toward the axis of rotation thereby giving up kinetic energy to maintain said predetermined velocity.

No references cited.